United States Patent [19]

Sosinski et al.

[11] Patent Number: 5,003,127

[45] Date of Patent: Mar. 26, 1991

[54] INTERFLOOR POWER/COMMUNICATION CONNECTION APPARATUS

[75] Inventors: Charles W. Sosinski, Linden; Paul W. Morgan, Edison, both of N.J.

[73] Assignee: Thomas & Betts Corporation, Bridgewater, N.J.

[21] Appl. No.: 351,682

[22] Filed: May 12, 1989

[51] Int. Cl.⁵ ............................................. H02G 3/22
[52] U.S. Cl. .................................................... 174/48
[58] Field of Search ............................. 174/48; 52/221

[56] References Cited

U.S. PATENT DOCUMENTS

| | | | |
|---|---|---|---|
| 3,864,883 | 2/1975 | McMarlin | 52/221 |
| 3,995,102 | 11/1976 | Kohaut | 174/48 |
| 4,088,827 | 5/1978 | Kohaut | 174/48 |
| 4,099,020 | 7/1978 | Kohaut | 174/48 |
| 4,243,835 | 1/1981 | Ehrenfels | 174/48 |
| 4,259,542 | 3/1981 | Tehan et al. | 174/48 |
| 4,264,779 | 4/1981 | Rhodes et al. | 174/48 |
| 4,272,643 | 6/1981 | Carroll et al. | 174/48 |
| 4,323,723 | 4/1982 | Fork et al. | 174/48 |
| 4,323,724 | 4/1982 | Shine | 174/48 |
| 4,324,078 | 4/1982 | Gray | 52/221 |
| 4,336,416 | 6/1982 | Goodsell | 174/48 |
| 4,408,090 | 10/1983 | Kohaut | 174/48 |
| 4,477,694 | 10/1984 | Kohaut | 174/48 |
| 4,496,790 | 1/1985 | Spencer | 174/48 |
| 4,572,923 | 2/1986 | Castellani et al. | 174/48 |
| 4,573,297 | 3/1986 | Benscoter et al. | 52/221 |
| 4,770,643 | 9/1988 | Castellani et al. | 439/135 |
| 4,827,080 | 5/1989 | Castellani et al. | 174/48 |

OTHER PUBLICATIONS

Hubbell Catalog (H 4312) dated 1987.

Primary Examiner—Leo P. Picard
Assistant Examiner—David A. Tone
Attorney, Agent, or Firm—Robert M. Rodrick; Salvatore J. Abbruzzese

[57] ABSTRACT

An electrical connection housing assembly for insertion in an interior passage for floor-to-floor electrical transmission of both power and communication includes a first housing comprised of first matter, a second housing comprised of second matter of lesser heat conductivity than the first matter, the second housing having a first portion assembled with the first housing and a second portion extending from the first housing and a divider arrangement for separating respective power and communication cables to be inserted in the assembly from one another. The divider arrangement includes a first divider, comprised of a resilient strip of intumescent material, fixedly supported in the assembly and a second divider removably supported in the assembly and in registry with the first divider for jointly defining respective power and communication channels through the assembly. Diverse power pedestals can be individually applied to the assembly, which has capability for the receipt of different such second dividers associated with the different pedestals. The second different divider may be formed derivatively from the first divider.

27 Claims, 7 Drawing Sheets

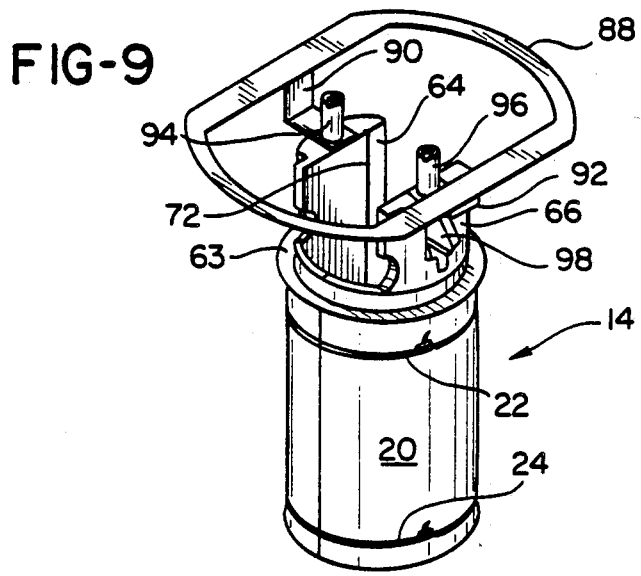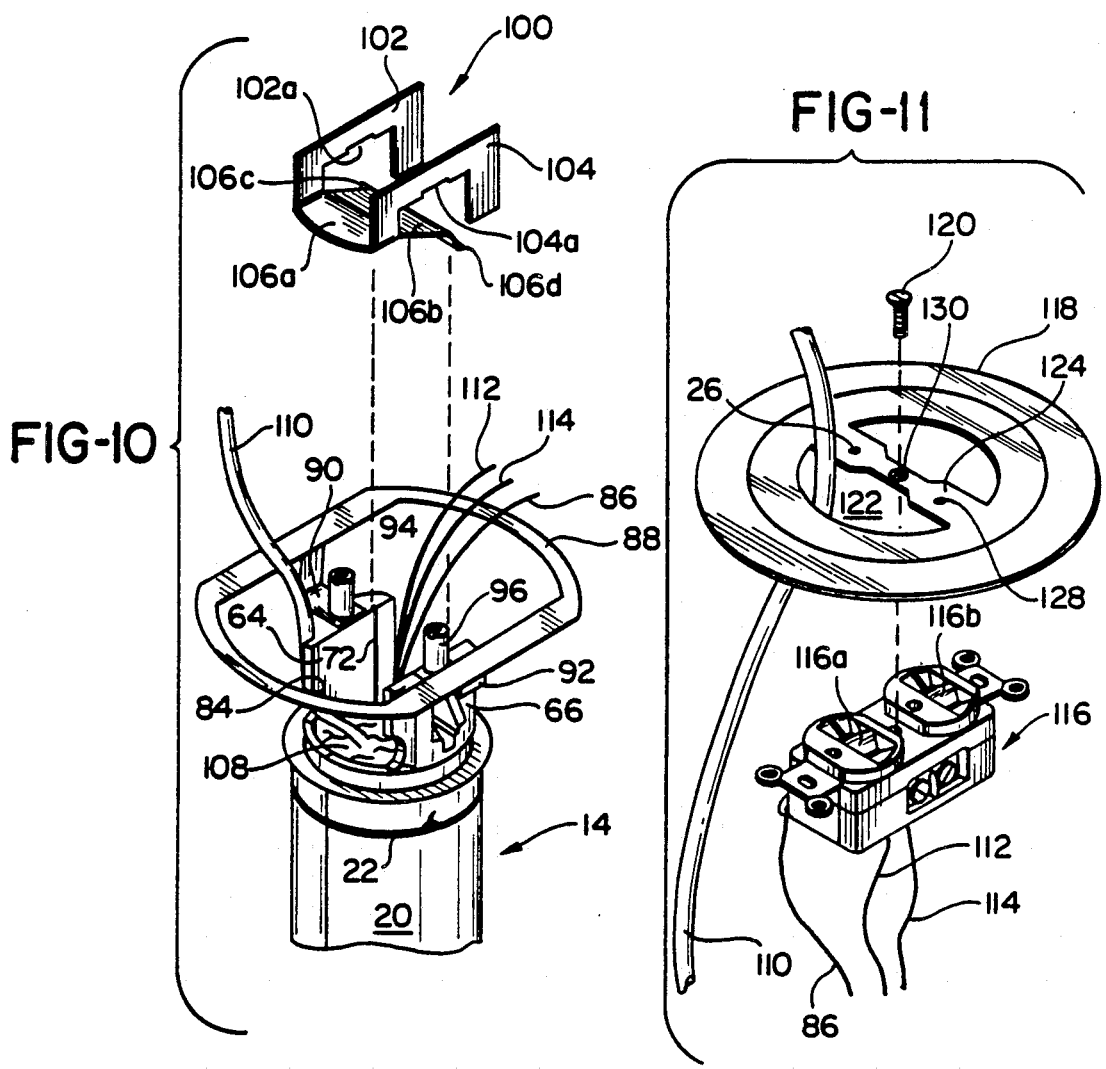

INTERFLOOR POWER/COMMUNICATION CONNECTION APPARATUS

FIELD OF THE INVENTION

This invention relates generally to apparatus and methods for the transmission of electrical power and communication signals from one building floor to another and pertains more particularly to so-called "poke-thru" devices adapted for disposition in passages formed through concrete floors.

BACKGROUND OF THE INVENTION

There has been extensive prior art activity in the pursuit of averting the use of on-floor conduits for conveying electrical power and communication lines to floor locations which were not within the original architectural and electrical planning of a facility, such as a multi-floor concrete building. Such on-floor conduits are in the first place aesthetically unpleasant and secondly can give rise to personnel danger, such as by tripping over the same.

While the art has averted these problems in the introduction of flat undercarpet cable installations, the problem remains extant in the use of the conventional discrete wiring systems in place in general in existing buildings and for many currently-planned facilities for which the undercarpet approach is not elected.

In the conventional discrete installations, the problem under discussion has been addressed by drilling a passage through the concrete floor and conducting power and/or communication signals from a lower floor to the floor in which a new power and/or communication signal outlet is desired. Electrical safety codes have place two sanctions on such activity. Firstly, it is essential that the installed transition apparatus not function as a chimney or fire-advancing flue in the event of fire occurrence on the lower floor. Secondly, it is imperative that the transition apparatus not function as a conductive heat channel between floors.

The industry has largely met these requirements through the use of intumescent material in the transition apparatus, such material expanding under fire conditions against the concrete circumscribing the passage to effectively block the pre-existing flue which may have been present in the passage. Further, the art has reached structures which have conductive heat blocking members, i.e., synthetic spacers, disposed axially between and separating conductive heat communication between heat conductive members of the apparatus.

Presently known transition apparatus is seen as lacking versatility in respect of the types of pedestals which may be used therewith. Thus, two diverse types of pedestals are in widespread use, i.e., the flush-mount pedestal and the low-profile pedestal, the latter protruding upwardly of the floor to an extent and the former being essentially continuous with the floor. Known transition devices thus are designed to be dedicated to one or the other of the pedestal types, necessitating matching thereof, increased inventory and other disadvantages.

SUMMARY OF THE INVENTION

The present invention has as its primary object the provision of improved transition apparatus for interfloor conveyance of electrical power and communication signals.

A particular object of the invention is to provide interfloor electrical connection apparatus adapted for use with diverse types of pedestals.

In the attainment of these and other objects, the invention provides an electrical connection housing assembly for insertion in an interfloor passage for floor-to-floor electrical transmission of both power and communication, the housing assembly being adapted for disposing diverse types of receptacles at one of the floors. The assembly includes a first housing comprised of first matter and a second housing comprised of second matter of lesser heat conductivity than the first matter. The second housing has a first portion assembled with the first housing and a second portion extending from the first housing. A power/comunication divider unit is provided for separating respective power and communication cables to be inserted in the assembly from one another and the second housing defines common keying for individual receipt of diverse such dividers associated with diverse types of receptacles.

In another aspect, the invention provides an electrical connection housing assembly for the above purposes wherein the divider unit comprises a first divider secured in the first housing and extending into the second housing and a second divider insertable in the assembly from atop the second housing and registrable on such insertion with the first divider, the second divider being variably selectable in accordance with the choice of pedestal type. The first divider is comprised of a resilient strip and is preferably comprised of intumescent material.

In a particularly preferred embodiment, common divider structure may be manipulated on-site to be usable in original or manipulated form in accordance with on-site pedestal selection.

The foregoing and other objects and features of the invention will be further understood from the following detailed description of preferred embodiments thereof and from the drawings, wherein like reference numerals identify like parts and components throughout.

BRIEF DESCRIPTION OF THE DRAWINGS

FIG. 9 is a partial perspective view of the FIG. 1 assembly with a locating bracket applied thereto.

FIG. 10 is an exploded perspective view of the FIG. 9 assembly and a removable divider for insertion therein.

FIG. 11 is an exploded perspective view of a first type of pedestal and a cover plate therefor.

DETAILED DESCRIPTION OF PREFERRED EMBODIMENTS AND PRACTICES

Figure 1:
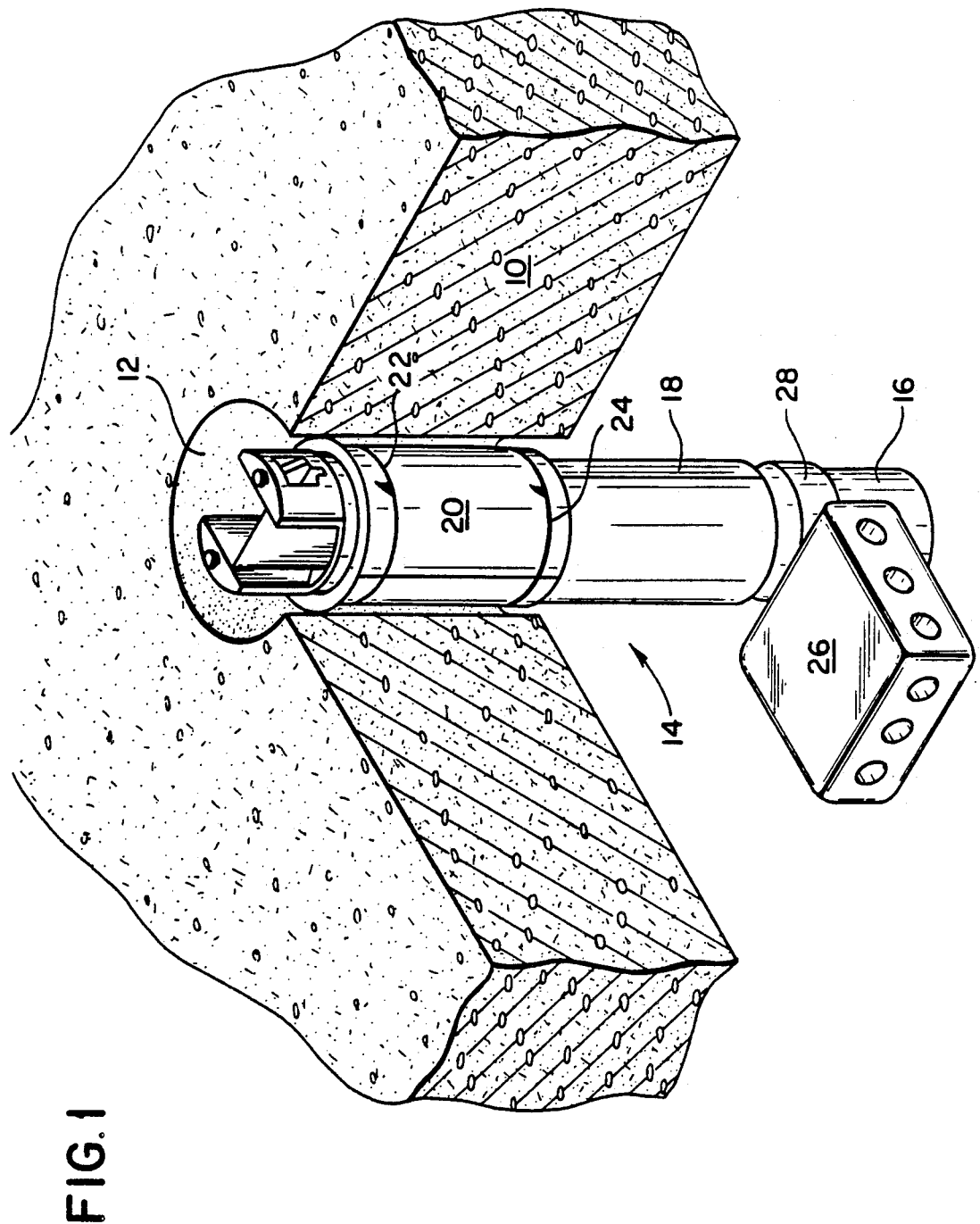
FIG. 1 is a perspective view of a partial connector housing assembly in accordance with the invention disposed in a concrete floor passage, the concrete being broken away for purposes of illustration.

Referring to FIG. 1, concrete floor 10 has passage 12 formed therethrough and connector housing assembly 14 formed in part in accordance with the invention is disposed in passage 12. Assembly 12 includes lower housing 16, upper housing 18, intumescent material 20 wrapped about assembly 14 and secured thereto by wire straps 22 and 24. An electrical connection box 26 is secured to lower housing 16 by strap 28, whereby electrical power and communication signals on an underfloor may be advanced to an upper floor, the cabling therefor not being shown in FIG. 1.

Figure 2:
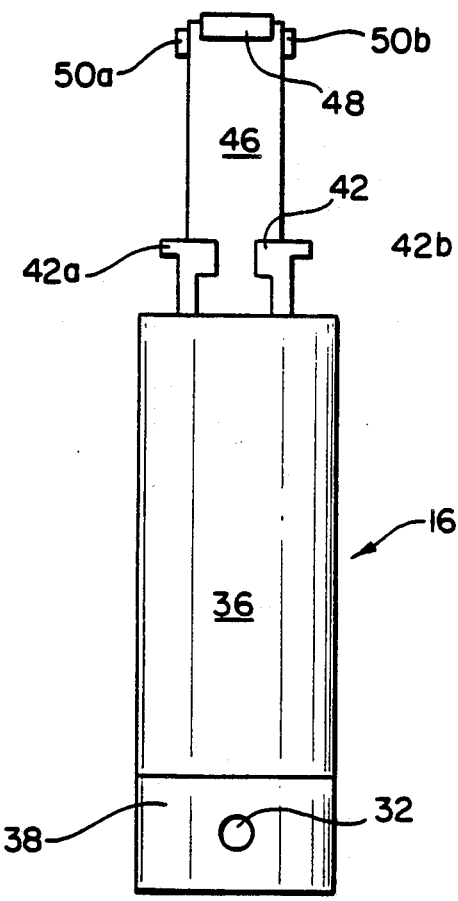
FIG. 2 is a front elevation of the lower housing of the FIG. 1 assembly.
Figure 3:
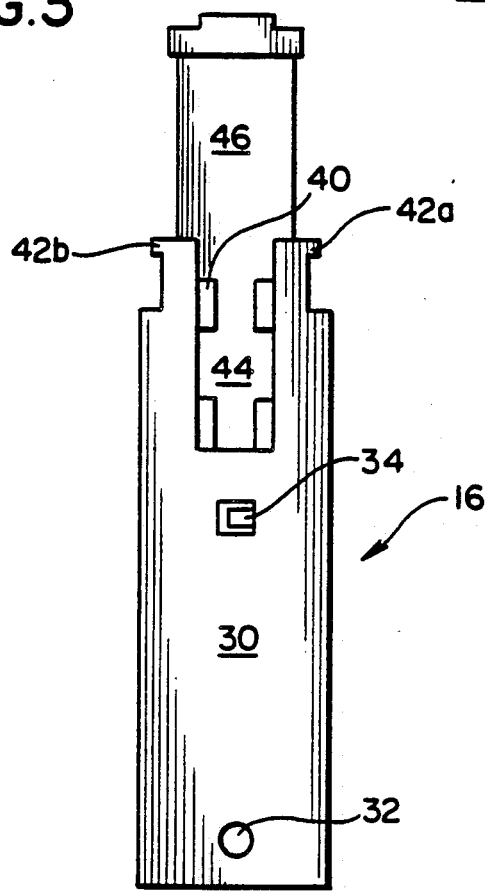
FIG. 3 is a rear elevation of the housing of FIG. 2.
Figure 4:
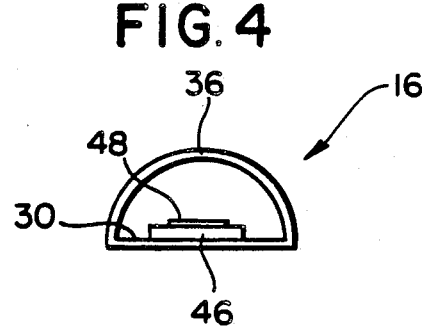
FIG. 4 is a bottom plan view of the housing of FIG. 2.
Figure 8:
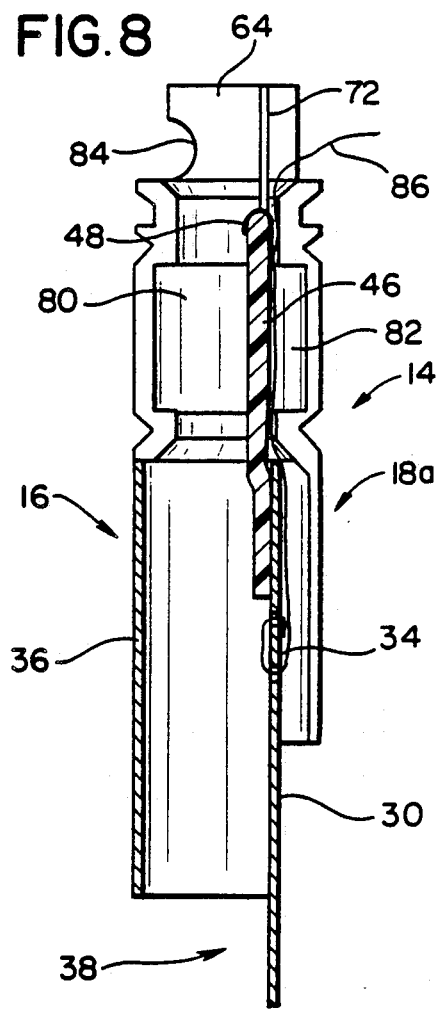
FIG. 8 is a sectional view of the assembled lower and upper housings as would be seen from the upper housing joinder line 52 of FIGS. 5 and 6.

Turning to FIGS. 2-4, lower housing 16 includes a flat wall 30 which is comprised of electrically conductive matter, such as a metal, and defines a ground connection opening 32 and a fitting 34 for connection of a grounding wire, e.g., wire 86 in FIG. 8.

Housing 16 has arcuate front wall 36 continuous with flat wall 30 and defining therewith a channel for the receipt of a communication cable. A lowermost opening 38 is formed in front wall 36 for insertion of the communication cable.

Wall 30 has a top opening 44 bounded by tabs 40 on its rearward side and by tabs 42 on its forward side for the receipt and retention of separator or first divider 46 which extends upwardly from wall 30 axially therewith to a free end at which divider 46 has member 48 affixed thereto. Divider 46 is formed as a resilient strip of intumescent material and member 48 comprises a metal clip crimped onto the strip. Keys 42a and 42b are formed on tabs 42 and keys 50a and 50b are formed on member 48 for purposes discussed below.

Figure 5:
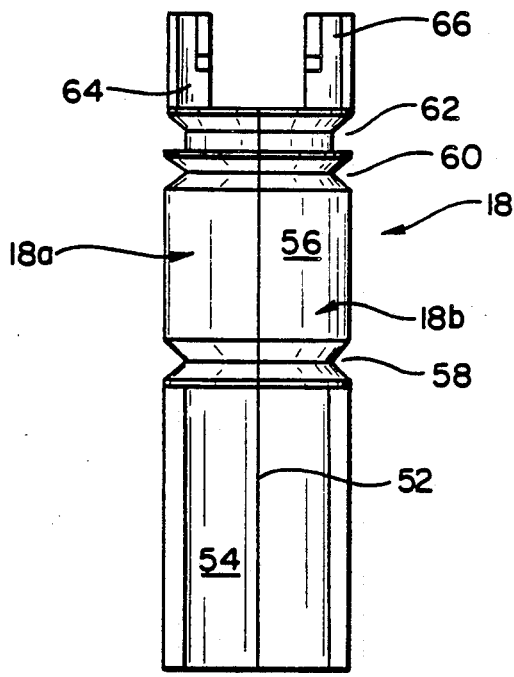
FIG. 5 is a front elevation of the upper housing of the FIG. 1 assembly.
Figure 6:
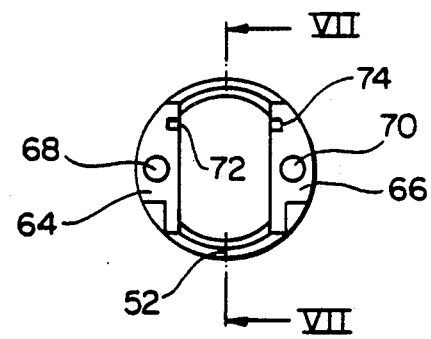
FIG. 6 is a top plan view of the housing of FIG. 5.
Figure 7:
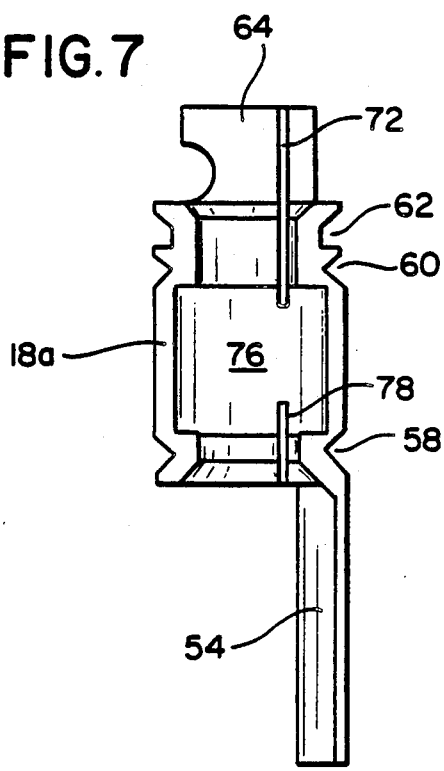
FIG. 7 is a sectional view as would be seen from plane VII—VII of FIG. 6.

FIGS. 5-7 depict the configuration of upper housing 18 of FIG. 1. In preferred form, housing 18 is comprised of parts 18a and 18b, which are matable along mating line 52, each such part being inclusive of a tail section 54 of open partial semi-cylindrical configuration and a further section 56 of full semi-cylindrical confuguration. Recesses are formed in section 56 as at 58 and 60 for cooperation with straps 24 and 22 respectively for securement of intumescent material 20 (FIG. 1).

Recess 62 supports the receipt of sealing ring 63 (FIG. 9). Upwardly of section 56, housing 18 has projections 64 and 66 which are in spaced and facing relation to one another. Threaded openings 68 and 70 are formed respectively in projections 64 and 66, as are slots 72 and 74. As is seen particularly in FIG. 7, compartment 76 is recessed in the sidewall of the housing sections for the receipt of an intumescent material cylinder, not shown. FIG. 7 also depicts lower interior slot 78 formed in member 18a for purposes below discussed.

FIG. 8 shows a sectioned assembly of lower housing 16 and upper housing 18a, wherein divider 46 is shown in positionally controlled position, defining channels or compartments 80 on one side thereof and 82 on the other side thereof. In this connection, key 42b and key 50b are resident respectively in slots 78 and 72, key 42a is resident in a slot counterpart to slot 78 in housing 18b and key 50a is resident in slot 74 (FIG. 6). Arcuate section 84 is formed in projection 64 to pass the communication cable upon insertion thereof in compartment 80. Grounding wire 86, affixed, typically by soldering, to member 34 extends through compartment 82 exteriorly of assembly 14.

Turning to FIG. 9, in preparation of assembly 14 for use with a first type of pedestal, i.e., a flush-mount pedestal, locating bracket 88 is applied to projections 64 and 66 by placing its dependent arms 90 and 92 on the projections and securing the same in place with fittings 94 and 96. A side channel 98 is formed in projection 66, and also in projection 64 (not shown) for constraining a securement nut against rotation for cooperation with fittings 96 and 94.

Divider 100 (FIG. 10) is formed of sheet metal and includes sidewalls 102 and 104 defining notches 102a and 104a and floor 106a from which extends a tapered portion 106b the latter including keys 106c and 106d. Surfaces of the divider may be coated with a plastic film as desired.

Prior to insertion of divider 100 in assembly 14, putty 108 is used to fill the inside of the assembly, being firmly placed about communication cable 110, grounding wire 88, and power conductors 112 and 114. Communication cable 110 is dressed through opening 84 as indicated Divider 106 is now inserted into the assembly, keys 106c and 106d entering slots 72 and 74 respectively, insertion continuing until ends of arms 90 and 92 register with notches 102a and 104a.

Turning to FIG. 11, receptacle 116 has dual outlets 116a and 116b of customary three prong type. Cover plate 118 is secured to receptacle 116 by screw 120 and includes opening 122 for access to the outlets. Crossarm 124 centrally spans opening 122 and includes side openings 126 and 128 and central opening 130 for passage of screw 120.

Figure 12:
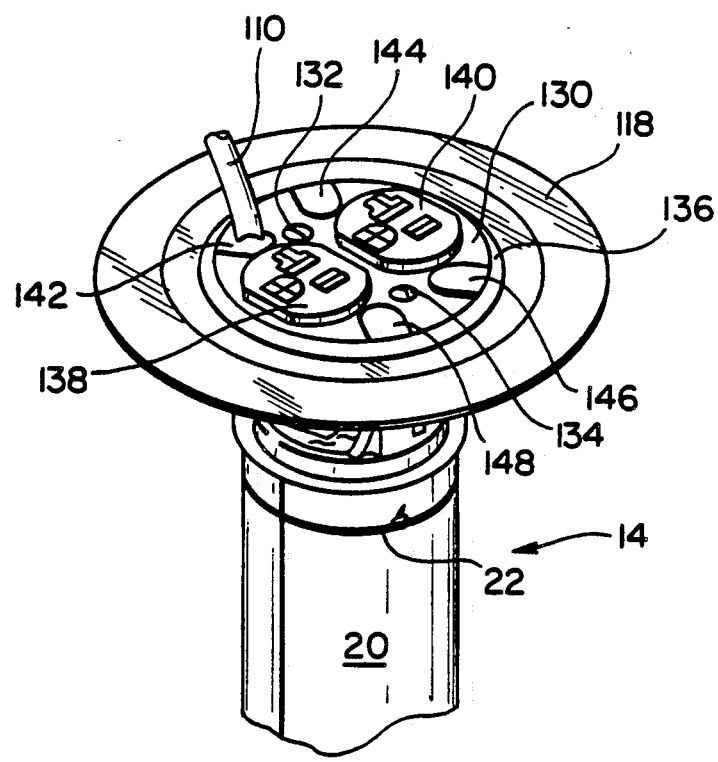
FIG. 12 is a perspective view showing the pedestal and cover plate of FIG. 11 applied to the assembly reached in FIG. 10.

The completion of assembly 14 is depicted in FIG. 12, where plate 130 is shown secured in place by screws 132 and 134, which reside in openings 126 and 128 of cover plate 118 of FIG. 11. Plate 130 is situated on protective cover 136, which is a resilient member defining pads 138 and 140 in registry with outlets 116a and 116b and peripheral pads 142, 144, 146 and 148. Cover 136 is composed such that it is impermeable to dust and the like and functions as a barrier to the same entering the assembly, but is penetrable to permit passage of communication cable 110 through one of its peripheral pads, as shown at pad 142. Further, the prongs of electrical plugs are insertable through pads 138 and 140 and, upon removal of the plugs, cover 136 self-closes.

Figure 13:
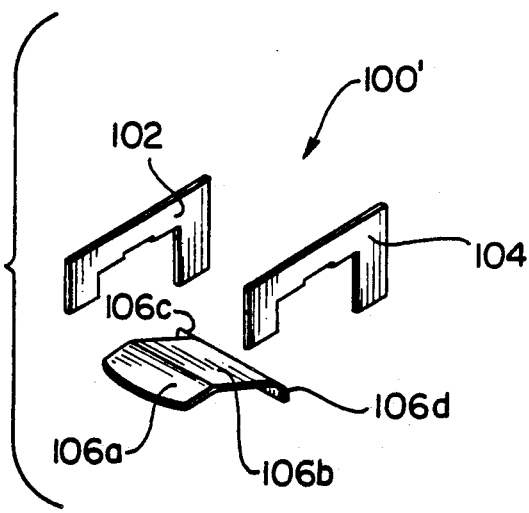
FIG. 13 is an exploded perspective view of manipulation of the divider of FIG. 10.
Figure 14:
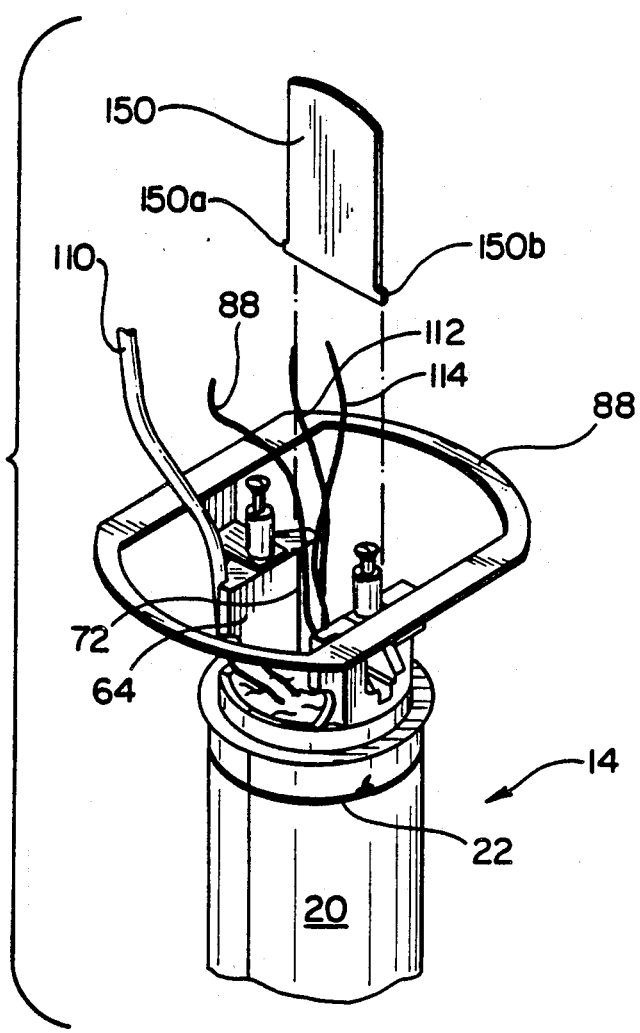
FIG. 14 is an exploded perspective of a second divider, reached by the FIG. 13 manipulation of the FIG. 10 divider and the FIG. 1 assembly.

For purposes of illustration, it will now be assumed that a user wishes to change the pedestal installation described to this juncture with an above-floor pedestal, such as a low profile pedestal. The assembly of FIG. 12 is disassembled and divider 100 is removed and manipulated with the result shown in FIG. 13. The separate pieces indicated at 100' are provided by breaking the sheet metal apart to yield separately the sidewalls 102 and 104 and an integral member comprising floor 106a, tapered portion 106b and keys 106c and 106d. The integral piece is now flattened to form divider 150, shown in FIG. 14 and having keys 150a and 150b.

Figure 15:
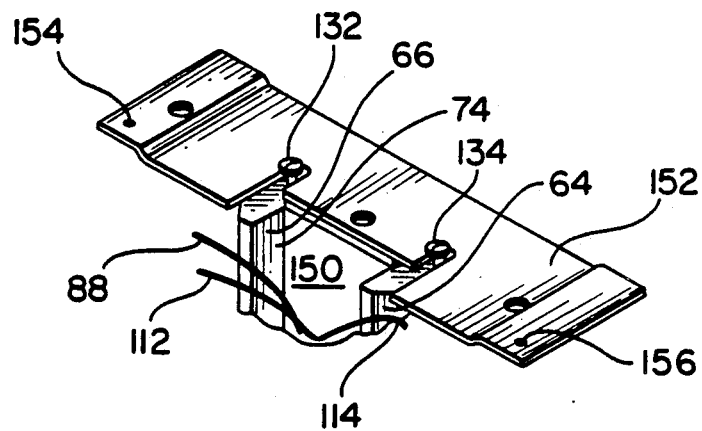
FIG. 15 is a perspective view of the FIG. 13 assembly with a pedestal mounting plate applied thereto.
Figure 16:
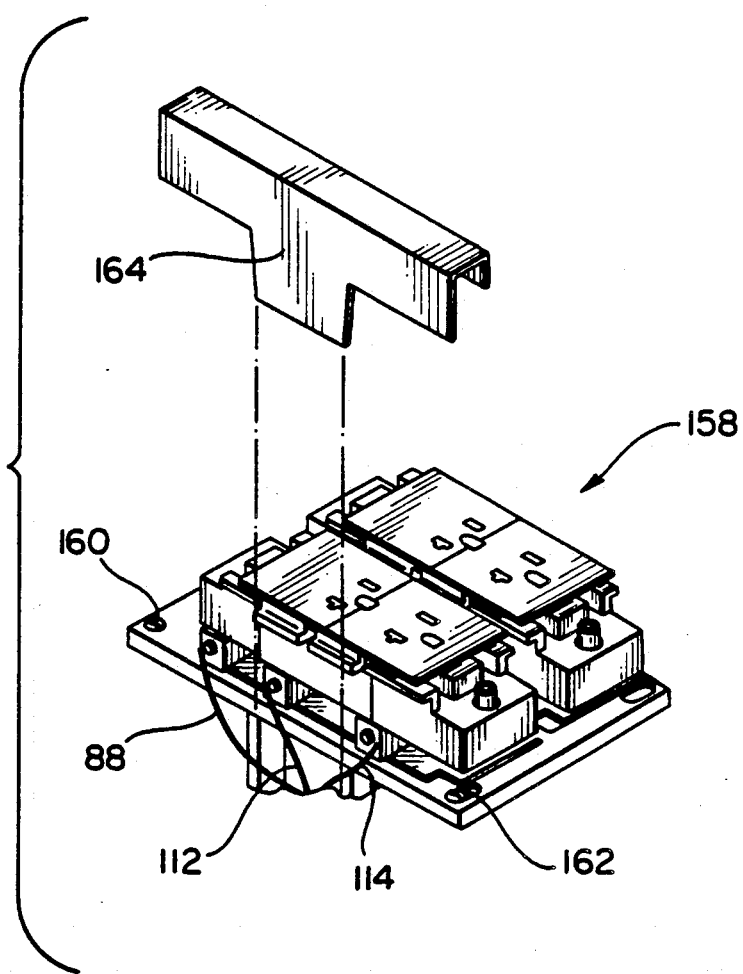
FIG. 16 is an exploded perspective view of the FIG. 15 assembly and a pedestal divider.

Locating bracket 88 and fittings 94 and 96 are removed from projections 64 and 66 and, with divider 150 in place with keys 150a and 150b resident respectively in slots 72 and 74, mounting plate 152 (FIG. 15) is secured atop the projections by screws 132 and 134. Duplex pedestal 158 is now secured atop mounting plate 152 as is indicated in FIG. 16, mounting screws 160 and 162 being threaded into mounting plate openings 154 and 156. A further divider 164 is now placed over the pedestal terminals to which wires 88, 112 and 114 are connected. Finally, the pedestal cover (not shown) is installed.

Various changes may be introduced in the foregoing apparatus and modifications may be made in the described practices without departing from the invention. For example, divider 150 may evidently be separately fabricated and not formed derivately from divider 100 Accordingly, it is to be appreciated that the particularly depicted and described embodiments and practices are intended in an illustrative and not in a limiting sense. The true spirit and scope of the invention are set forth in the following claims.

What is claimed is:

1. An electrical connection housing assembly for insertion in an interfloor passage for floor-to-floor electrical transmission of both power and communication, said housing assembly comprising:
    (a) a first housing comprised of first matter;
    (b) a second housing comprised of second matter of lesser heat conductivity than said first matter, said second housing having a first portion assembled with said first housing and a second portion extending from said first housing; and
    (c) divider means for separating respective power and communication cables to be inserted in said assembly from one another;
    said divider means including a first divider comprised of a resilient strip of intumescent material fixedly supported by said first and second housings and a second divider removably supported by said second housing in registry with said first divider.

2. The invention claimed in claim 1 wherein said second housing defines slot means for positionally controlling said first and second dividers and wherein said first and second dividers include key means for disposition in said slot means and effecting said registry.

3. The invention claimed in claim 2 wherein said first housing includes key means for joinder thereof to said second housing.

4. The invention claimed in claim 3 wherein said second housing slot means includes first and second slots, said first divider key means and said second divider key means being jointly resident in said first slot and said key means of said first housing being resident in said second slot.

5. The invention claimed in claim 1 wherein said first housing is comprised of electrically conducive matter and is of elongate configuration, having a flat wall and an arcuate wall continuous with said flat wall and defining therewith a channel for the receipt of said communication cable.

6. The invention claimed in claim 5 wherein said first divider is supported by said first housing flat wall and extends generally axially therefrom, said first divider having a key at an end thereof distal from said flat wall.

7. The invention claimed in claim 6 wherein said second housing is comprised of electrically insulative matter and is of elongate configuration, having a first portion complemental with said first housing to define therewith a channel for the receipt of said power cable.

8. The invention claimed in claim 7 wherein said second housing includes a second portion extending from said first portion thereof and of closed cylindrical configuration, first and second projections extending from said second portion in spaced facing relation to one another.

9. The invention claimed in claim 8 wherein at least one of said first and second projections includes a slot extending therewith and configured for the receipt of said first divider key, said first divider being resident in said second housing and positionally controlled therein by engagement of said first divider key in said slot, thereby continuing said power and communication channels through said second housing second portion.

10. The invention claimed in claim 9 wherein said second divider includes key means configured for entry also into said slot, thereby continuing said power and communication channels beyond said second housing second portion between said projections.

11. The invention claimed in claim 10 wherein said first housing includes key means adjacent an end of said first divider, said second housing defining a further slot, said first housing key means being resident in said further second housing slot.

12. The invention claimed in claim 10 further including a flush-mount pedestal connected therewith.

13. The invention claimed in claim 10 further including a low profile pedestal connected therewith.

14. A kit of parts for the installation of electrical connection transition apparatus in a passage formed through a floor, comprising:
    (a) a housing insertable in said passage;
    (b) first divider means fixedly disposed in said housing and dividing a lower portion of said housing into separate channels for the receipt of respective power and communication cabling;
    (c) plural diverse electrical connection pedestals for assembly with said housing; and
    (d) single second divider means for insertion into said housing to continue said separate channels fully through said housing, said single divider means being usable directly upon selection for use of one such pedestal and being changeable in configuration for use of other such pedestals.

15. The invention claimed in claim 14, wherein said second divider means is changeable for use with said other such pedestals by the selective removal of portions thereof.

16. The invention claimed in claim 14 wherein first divider is comprised of a resilient strip of intumescent material.

17. The invention claimed in claim 14 wherein said first divider is jointly fixedly supported by said first and second housings and wherein said second divider is supported by said second housing in registry with said first divider.

18. The invention claimed in claim 17 wherein said second housing defines slot means for positionally controlling said first and second dividers and wherein said first and second dividers include key means for disposition in said slot means and effecting said registry.

19. The invention claimed in claim 18 wherein said first housing includes key means for joinder thereof to said second housing.

20. The invention claimed in claim 19 wherein said second housing slot means includes first and second slots, said first divider key means and said second divider key means being jointly resident in said first slot and said key means of said first housing being resident in said second slot.

21. The invention claimed in claim 14 wherein said first housing is comprised of electrically conductive matter and is of elongate configuration, having a flat wall and an arcuate wall continuous with said flat wall and defining therewith a channel for the receipt of said communication cable.

22. The invention claimed in claim 21 wherein said first divider is supported by said first housing flat wall and extends generally axially therefrom, said first divider having a key at an end thereof distal from said flat wall.

23. The invention claimed in claim 22 wherein said second housing is comprised of electrically insulative matter and is of elongate configuration, having a first portion complemental with said first housing to define therewith a channel for the receipt of said power cable.

24. The invention claimed in claim 23 wherein said second housing includes a second portion extending from said first portion thereof an of closed cylindrical configuration, first and second projections extending from said second portion in spaced facing relation to one another.

25. The invention claimed in claim 24 wherein at least one of said first and second projections includes a slot extending therewith and configured for the receipt of said first divider key, said first divider being resident in said second housing and positionally controlled therein by engagement of said first divider key in said slot, thereby continuing said power and communication channels through said second housing second portion.

26. The invention claimed in claim 25 wherein said second divider includes key means configured for entry also into said slot, thereby continuing said power and communication channels beyond said second housing second portion between said projections.

27. The invention claimed in claim 26 wherein said first housing includes key means adjacent an end of said first divider, said second housing defining a further slot, said first housing key means being resident in said further second housing slot.

* * * * *